Aug. 20, 1929.  M. L. MARTUS ET AL  1,725,716
PRIMARY BATTERY
Filed Dec. 21, 1926
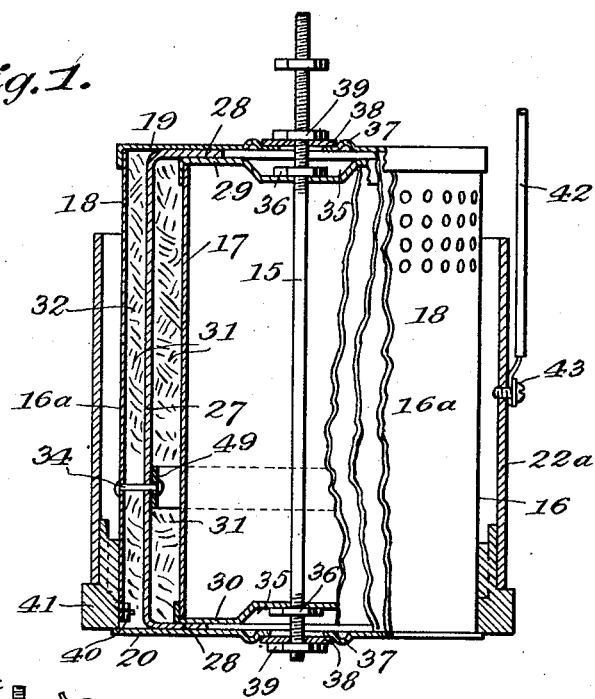
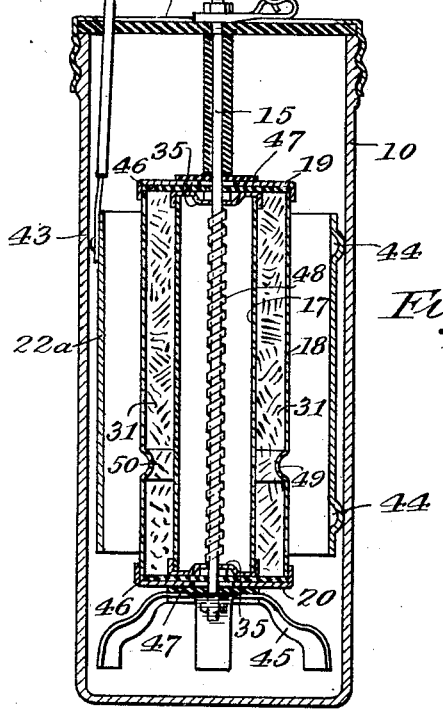
INVENTORS
Martin L. Martus,
Edmund H. Becker, and
James G. Ross.
BY Chamberlain & Newman
ATTORNEYS.

Patented Aug. 20, 1929.

1,725,716

UNITED STATES PATENT OFFICE.

MARTIN L. MARTUS, OF WOODBURY, AND EDMUND H. BECKER AND JAMES G. ROSS, OF WATERBURY, CONNECTICUT.

PRIMARY BATTERY.

Application filed December 21, 1926. Serial No. 156,100.

Our invention relates to improvements in primary batteries of the type employing oxide of metal as the negative electrode, and zinc as the positive electrode, the two being employed in a jar in spaced relation to each other and submerged within a suitable electrolyte, such as caustic soda.

The invention refers more particularly to electrochemical means for increasing the active surface of a battery element by the action of the battery, and has for its object to provide a battery of this character which is prepared for functioning immediately upon being installed, and which will produce a uniform or straight line voltage during discharge.

Another object is to provide a battery wherein the electrodes may be supported from the jar or cover, and wherein by reason of its novel construction, there will be a tendency to reduce or diminish the peak voltage; and, to provide means whereby the conductivity of the oxide of copper depolarizer will begin at the part of the element furtherest from the zinc and cause the battery to have a comparatively low E. M. F. at the start and still be within the working range, for the service required. The reduced oxide of copper working towards the zinc element during discharge thereby diminishing the distance between this point and the negative element.

An important feature is to provide means which will serve to first reduce that portion of the black oxide of copper which lies against the inner walls of the oxide container and give to it its initial conductivity. By this means we provide a battery which, in effect, works from the inside outward, so to speak, along a substantially vertical line until this line of reduced copper reaches a predetermined point.

It is our invention to take advantage of the fact that the black oxide of copper is for all practical purposes a non-conductor. The black oxide of copper surface in itself is quite inactive. We start with a very small portion of the depolarizer surface active, the larger portion being gradually made active as the cell is used. Our invention has shown decidedly better results during the latter part of the life of the cell, at which time practically all other batteries of the usual type and construction show their low point of efficiency. By our invention we maintain the battery in a state where it is most economical in delivering its energy.

With the above and other objects in view, an embodiment of the invention is shown in the accompanying drawings, and will be hereinafter more fully described with reference thereto, and wherein the invention will be finally pointed out in the claims.

In the drawings:

Fig. 1 shows a vertical sectional elevational view of an assembly of battery elements embodying the invention, the jar being omitted; and Fig. 2 is a vertical sectional view of our "Telecell" type of battery as contained within a jar and embodying a modification of the invention.

Similar reference characters indicate corresponding parts throughout the several figures of the drawings.

In Fig. 2, we show our present invention applied to our "Telecell" form of battery disclosed in prior Patent No. 1,579,558. This design of battery is more particularly adapted for all general purposes where dry cells are used, and is much narrower than the track circuit type of batteries shown in the other figure of the drawing. As shown, in this figure the battery includes a jar 10, a cover 11ᵃ and a threaded ring 12 to engage the top threaded portion of the battery jar to hold the cover in position. This cover further includes a central hole 13 through which the suspending rod 15 for the negative electrode is positioned for the suspension of the electrodes within the jar.

The negative electrodes 16 are annular in form and include an inner and outer annular metallic cylinder 18, and a filling of oxide of copper 31. The end caps 35 for the inner cylinder 17 of this element are practically the same as shown in Fig. 1, and are insulated from the outer caps 19 and 20 by means of insulated washers, 46. These caps and washers are obviously provided with central holes through which the suspension rod 15 is threaded in the assembling of the elements. An insulated washer 47 is also positioned against the outer face of the top and bottom caps 19 and 20, to further insulate the outer wall and end caps from the rod, in order to insure the action on the oxide of copper within the annular container, from the inside, instead of the outside as is generally the case.

We further provide a winding of zinc coated flat wire 48, upon the rod within the annular container, which wire serves to first reduce that portion of the black oxide of copper within the container that lies against the inner wall 17, which in turn, gives the oxide of copper its initial conductivity. The outer cylinder 18, as shown in this form, is provided with an annular groove 49 which may be formed by rolling the metal, and serves to narrow up the thickness of the container and thus produce a reduced annular area 50 of oxide of copper in the body of the electrode, so that when the external circuit of the battery is closed, the action will be to reduce the copper to metallic copper from the inside out, and along a substantially vertical line until this line of reduced copper reaches the annular depression 49 formed in the outer metal cylinder, which reduction of metal forms an electrical contact with said annular depressed portion of the outer cylinder, whereupon the copper is then also acted upon from the outside, thereby more than doubling the available surface of the depolarizer, causing the line of colorization to work inward, in a vertical plane until it is met by the previously established line, moving out, which completely consumes the element.

This same action obviously takes place in the construction shown in Fig. 1, wherein the vertical line of colorization of the powdered copper works outward toward the intermediate wall of blotting paper and until the line reaches the connectors 34 which immediately serve to connect the inner body of colored copper 31, with the outer metal cylinder 18, thus switching and starting an action against the outer strata of copper oxide 32, contained within the outer cylindrical pocket, thereby causing a reverse action from the outside inward, in addition to the previous line of action from the inside outward.

In the form of the invention shown in Fig. 1, the cylindrical negative element 16 is designed with a view of causing the battery to work from the inside out, particularly in its initial performance, and with this in mind, we have provided between the inner metallic wall 17 and the outer metallic wall 18, an intermediate cylinder 27 formed of blotting paper, the same having its end portions disposed inwardly to form an inwardly projected annular flange 28, one of which is held between the outer cap 19 and the inner cap 29, and the other between the lower cap 20 and the inner cap 30.

This annular wall 27 of blotting paper serves as an insulating diaphragm, preventing the black oxide of copper from being reduced to metallic copper beyond the diaphragm, until the oxide has been reduced at a point determined by the band 49, thereby making contact with the outer cylinder through studs 34, automatically closing the circuit on the outer cylinder causing the oxide in contact therewith to reduce the copper from the outside in, which more than doubles the surface of the depolarizer. An annular metal band 49 is provided against the inner wall of blotting paper, and is supported thereon by means of metal connectors 34 which extend through said band, blotting paper, and the outer cylinder 18, for a purpose which will again be referred to.

As before stated, the negative electrode 16 of the form of battery shown in Fig. 1 includes two caps at each end, both having an annular flange for the engagement of the cylinders, the inner caps 29 and 30 serving to engage and support the inner cylinder 17, while the outer caps 19 and 20 similarly serve to support the outer cylinder 18, the two said upper and lower caps being insulated, one from the other, by the inwardly-disposed annular flanges 28 of blotting paper heretofore referred to. The inner caps 29 and 30 are each provided with central indentations 35 forming a pocket for the nuts 36 mounted upon the rod 15 for clamping the caps 29 and 30 against the cylinder 17. The outer caps are stamped up to form an annular outwardly-disposed rib 37 which also serves to form a central recess in the outer face of the caps to receive an insulated washer 38 against which the clamping nuts 39 mounted upon the rod 15 are tightened. The central opening in these caps, to accommodate the suspending rod, is much larger than that required to receive the rod, thus preventing the caps from coming into engagement with the rod, and thereby insulating the outer caps as well as the outer metal cylinder 18 from the rod, whereas the inner caps and inner cylinder are directly connected to the rod, thus insuring an initial working of the battery from the inside out, as before suggested.

The zinc element 22$^a$ as employed in this cell, is of a commercial rolled type of cylindrical zinc, being of uniform thickness and proportioned to substantially enclose the cylindrical negative element 16. The said negative element has fastened to its outer side by means of screws and nuts 40, a number of supports 41, of insulating material (preferably porcelain), adapted to support the cylindrical form of zinc element 22$^a$, above referred to, in proper spaced relation to the cylindrical negative element, and in a manner to permit the said zinc to be removed and replaced as occasion may require. This zinc electrode, as shown, is provided with a rubber covered service wire 42, attached thereto, as at 43, in any suitable or preferred manner.

The positive element 22ª of this battery may be of a general cylindrical formation, with indentations 44 or corrugations for engagement with the side wall of the jar to hold the positive element in spaced relation thereto. This element, like that shown in Fig. 2, is provided with a rubber-covered wire 42, secured to the element at 43. The negative element in this form of battery is adapted to be suspended from a cover by a single central suspension rod 15.

Having thus described our invention what we desire to secure by Letters Patent is:

1. A primary battery including in part, a copper oxide negative element formed of a plurality of parts in contact with said oxide, one of said parts being electrically connected to a positive terminal of said battery and one of said members insulated from said positive terminal until the discharge of the battery has reached a predetermined point and means whereby the reduced copper oxide automatically bridges the insulation.

2. A primary battery including a copper oxide cathode, a zinc anode, and an active solution therefor, means for causing the copper oxide nearest the center of the cathode to be first reduced to give to it initial conductivity and to cause the battery to work from the inside outward to a predetermined point along a substantially vertical line, the reduced copper oxide serving as a conductor automatically connecting another conducting support.

3. A primary battery including a cylindrical copper oxide and zinc element and an active solution therefor, means for causing the copper oxide nearest the center of the cathode to be first reduced to give to it initial conductivity and to cause the battery to work from the inside outward to a predetermined point along a substantially vertical line, and means for switching the action to the outer face of the negative element and to work inward toward the previously reduced copper.

4. A primary battery including a copper oxide and zinc element and an active solution therefor, means for causing the copper oxide of one side of the element to be first reduced, and automatic means to shift the action on said element to the opposite side.

5. A primary battery including a copper oxide and zinc element and an active solution therefor, means for causing the copper oxide of one side of the element to be first reduced, and means within the element to shift the action thereon to the opposite side.

6. A primary battery including a copper oxide cathode and a zinc anode and an active solution therefor, means for causing one cathode surface to be first reduced and means within the cathode to shift the action thereon to another surface.

7. A primary battery including a copper oxide and zinc element and an active solution therefor, means for first reducing one side of the copper oxide to give to it initial conductivity, and means for switching the action upon the negative element to the outer face of the negative element to work inward toward the previously reduced copper.

8. A primary battery including a copper oxide element, a zinc element, and a solution therefor, the negative element including a conductive suspension rod, a body of copper oxide, parts for supporting the oxide, some of the said parts being electrically insulated from said rod and the other parts being electrically connected to said rod.

9. A primary battery including a copper oxide and zinc element and an active solution therefor, the negative element including an intermediate area toward which the copper oxide is reduced from two directions, and means for causing the copper oxide to be first reduced on one side working toward said intermediate area and then to automatically change and work from another side.

10. A primary battery including a copper oxide and zinc element and an active solution therefor, the negative element including an intermediate area toward which the copper oxide is reduced from two directions and means for causing the copper oxide to be first reduced around its inner area and working toward said intermediate area and additional means then causing it to change and work from another direction to completely reduce the entire element.

11. A primary battery including a copper oxide, a zinc element, and an active solution therefor, the negative element including an annular receptacle and having an inner and outer wall and filling of oxide of copper within said receptacle, paper cylinders, positioned within said annular receptacle to insulate the portions of copper oxide along a substantially vertical line until the discharge of the battery has reached a predetermined point and means whereby the reduced copper oxide automatically bridges the paper cylinders.

12. In a primary battery including a cathode, one of the constituent parts of which is copper oxide, a zinc element, an active solution, means for causing the copper oxide to be first reduced at one point, means for automatically cutting in a surface separated from the conductive surface of the said cathode to be acted upon electrochemically to reduce the copper oxide to the metallic state at any predetermined stage of exhaustion of said battery.

13. A primary battery including a depolarizer embodying a receptacle, a zinc anode, and an active solution therefor, a metallic suspension rod terminating at the top as the negative terminal of the cell, parts of said receptacle being insulated from the main suspension rod and other parts electrically connected thereto and insulative walls separating parts of the walls of the receptacle from said depolarizing material.

14. A primary battery including a copper oxid negative and a zinc positive element and an active solution therefor, said negative element having an intermediate area of less diameter than the remainder, means for causing the copper oxid of one side of the element and through said lesser diameter to be first reduced and means to shift the action on said element to the opposite side.

15. A primary battery including a depolarizer, embodying a receptacle, a zinc anode and an active solution therefor, a metallic suspension rod terminating at the top as the negative terminal of the cell, parts of said receptacle being insulated from the main suspension rod and other parts electrically connected thereto, and porous insulating walls separating parts of the walls of the receptacle from said depolarizing material.

Signed at Waterbury, in the county of New Haven and State of Connecticut, this 18th day of December, A. D., 1926.

MARTIN L. MARTUS.
EDMUND H. BECKER.
JAMES G. ROSS.